US008080801B2

United States Patent
Safai

(10) Patent No.: US 8,080,801 B2
(45) Date of Patent: Dec. 20, 2011

(54) INORGANIC SCINTILLATING MIXTURE AND A SENSOR ASSEMBLY FOR CHARGED PARTICLE DOSIMETRY

(75) Inventor: Sairos Safai, Manno (CH)

(73) Assignee: Paul Scherrer Institut, Villgan PSI (CH)

( * ) Notice: Subject to any disclaimer, the term of this patent is extended or adjusted under 35 U.S.C. 154(b) by 40 days.

(21) Appl. No.: 12/727,625

(22) Filed: Mar. 19, 2010

(65) Prior Publication Data

US 2010/0213390 A1 Aug. 26, 2010

Related U.S. Application Data

(63) Continuation of application No. 10/581,405, filed on Mar. 5, 2008, now abandoned, which is a continuation of application No. PCT/EP2004/009379, filed on Aug. 21, 2004.

(30) Foreign Application Priority Data

Dec. 4, 2003 (EP) .................................. 03027697
Dec. 4, 2003 (EP) .................................. 03027698

(51) Int. Cl.
*G01T 1/20* (2006.01)
(52) U.S. Cl. ..................................................... 250/368
(58) Field of Classification Search .................. 250/368
See application file for complete search history.

(56) References Cited

U.S. PATENT DOCUMENTS

| 4,230,510 A * | 10/1980 | Cusano et al. ............... 156/67 |
| 4,455,323 A | 6/1984 | Ishizuka et al. |
| 5,126,573 A * | 6/1992 | Knuepfer et al. ........ 250/486.1 |
| 5,126,578 A | 6/1992 | Roch et al. |
| 5,514,874 A | 5/1996 | Boone et al. |
| 5,672,465 A | 9/1997 | Patel et al. |
| 5,905,263 A * | 5/1999 | Nishizawa et al. .......... 250/368 |
| 6,392,236 B1 * | 5/2002 | Maekawa et al. .......... 250/369 |
| 2008/0164416 A1 * | 7/2008 | Safai .......................... 250/366 |

FOREIGN PATENT DOCUMENTS

WO 9402946 A1 2/1994

OTHER PUBLICATIONS

Fontbonne et al., "Scintillating Fiber Dosimeter for Radiation Therapy Accelerator," Oct. 2002, IEEE Transactions on Nuclear Science, vol. 49., pp. 2223-2227.*

(Continued)

*Primary Examiner* — David Porta
*Assistant Examiner* — Christine Sung
(74) *Attorney, Agent, or Firm* — Laurence A. Greenberg; Werner H. Stemer; Ralph E. Locher

(57) ABSTRACT

An inorganic scintillating mixture includes at least a first and a second component, each having a characteristic behavior in response to the irradiation with charged particles, such as protons and heavy ions, showing a typical Bragg peak with respect to a relative depth dose. The first component has a quenching characteristic in the Bragg peak region and the second component shows an increased efficiency in the Bragg peak region both related to a reference curve for the relative dose.

9 Claims, 4 Drawing Sheets

OTHER PUBLICATIONS

Torrisi, L., "Plastic scintillator investigations for relative dosimetry in proton-therap," Apr. 18, 2000, Nuclear Instruments and Methods in Physics Research, pp. 523-530.*

Beddar et al., "Water-Equivalent Plastic Scintillation Detectors for High-energy beam dosimetry: I. Physical characteristics and theoretical considerations," Feb. 1992, Phys. Med. Biol., vol. 37, pp. 1883-1900.*

Boon et al: "Fast 2D Phantom Dosimetry for Scanning Proton Beams", Medical Physics, vol. 25, No. 4, Apr. 1, 1998, pp. 464-475, New York, USA.

Hoss et al: "Time-Integrated Phospor Behaviour in Gated Image Intensifier Tubes", Image Intensifiers and Applications II, vol. 4128, Aug. 3, 2000, pp. 23-28, San Diego, California, USA.

* cited by examiner

--- Markus chamber
■ P43+P20
○ P43
△ P20

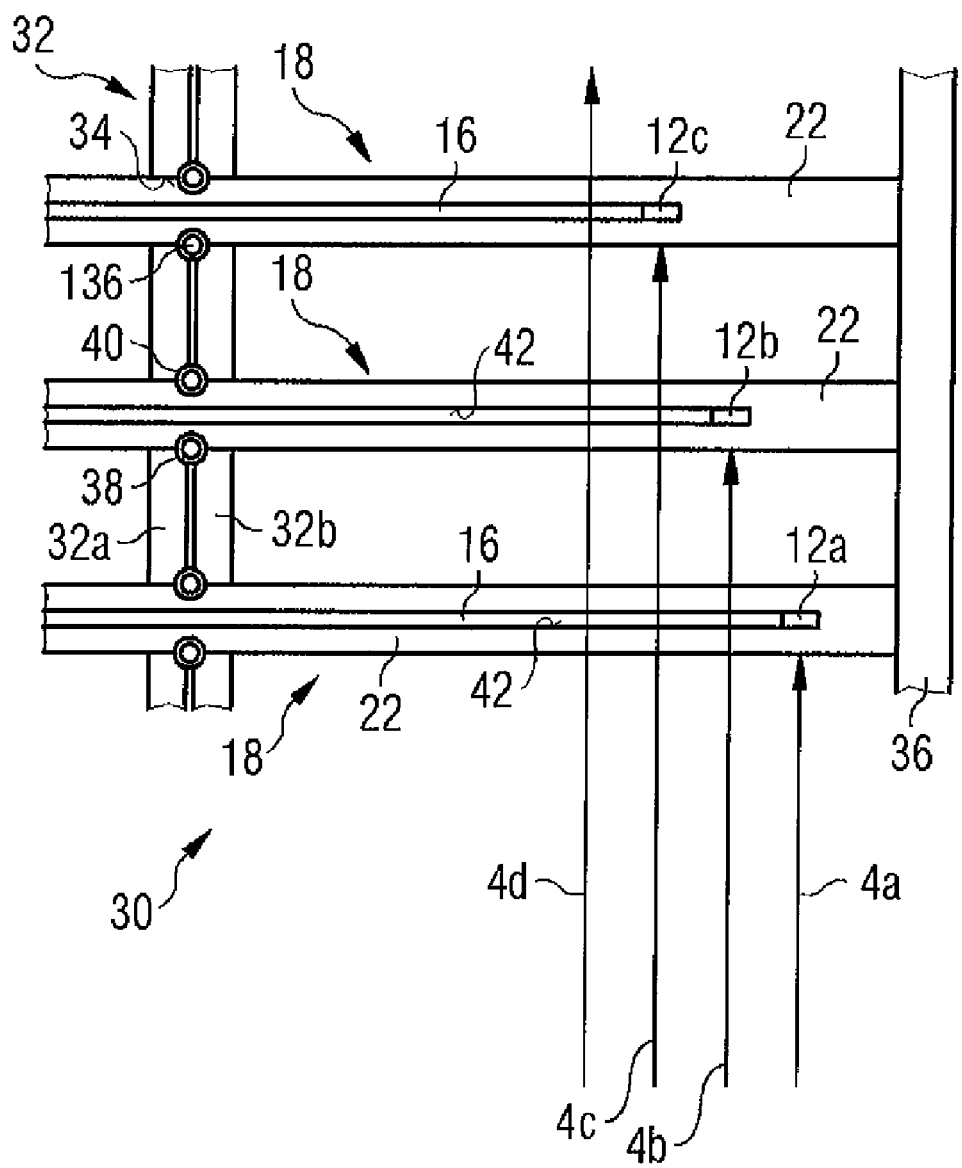

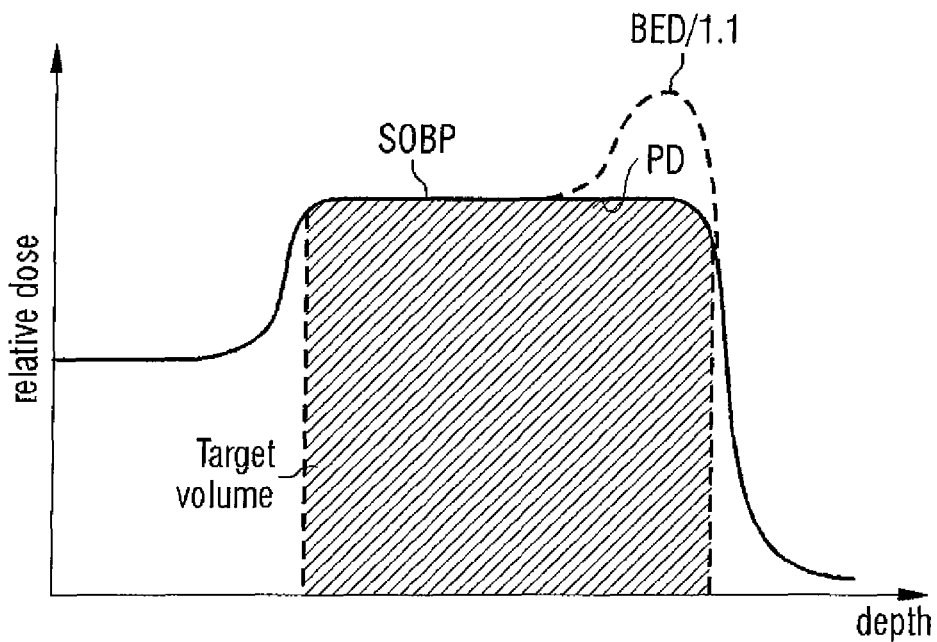
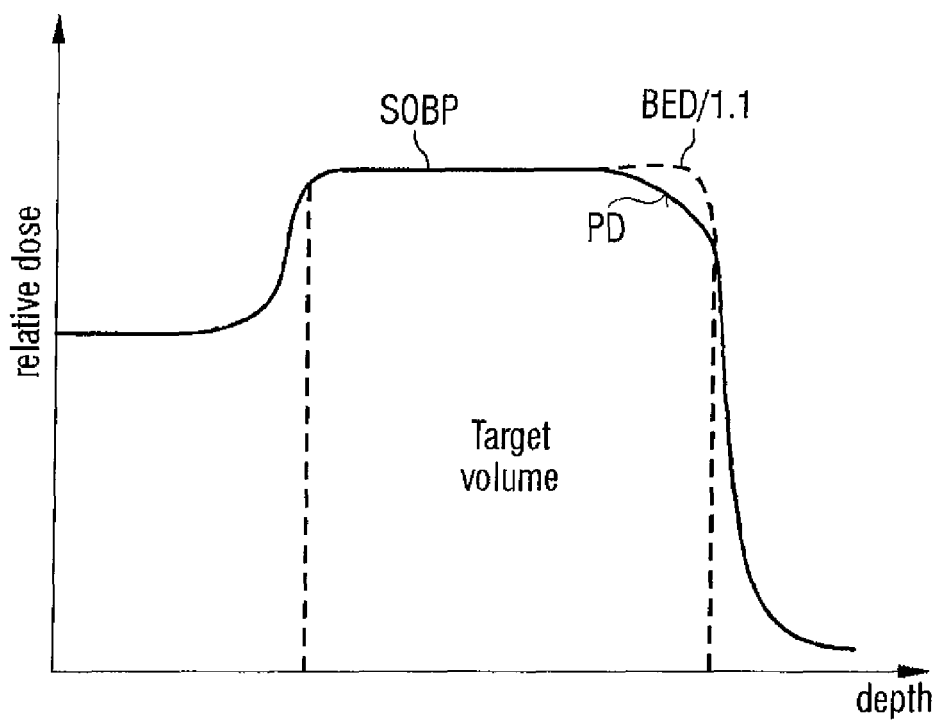

INORGANIC SCINTILLATING MIXTURE AND A SENSOR ASSEMBLY FOR CHARGED PARTICLE DOSIMETRY

CROSS-REFERENCE TO RELATED APPLICATION

This is a continuation application of application Ser. No. 10/581,405, filed Mar. 5, 2008; which was a continuation application, under 35 U.S.C. §120, of International application PCT/EP2004/009379, filed Aug. 21, 2004; the application also claims the priority, under 35 U.S.C. §119, of European patent applications No. EP 030 27 698.4 and EP 030 27 697.6, both filed Dec. 4, 2003; the prior applications are herewith incorporated by reference in their entirety.

BACKGROUND OF THE INVENTION

Field of the Invention

The invention relates to an inorganic scintillating mixture, i.e. for use in charged particle (i.e. protons and heavy ions) dosimetry, and further to a sensor assembly for charged particle dosimetry, i.e. using said inorganic scintillating mixture. Furthermore, the invention is related to several different utilizations of the scintillating mixture.

The signal generated by ionizing radiation within a scintillator of a dosimetry system is typically transmitted to a light-readout device by means of optical fibers. The light-readout device such as a charge coupled device (CCD) has the function of converting the transmitted light into an electrical signal. The transmitted optical signal may be focused on a CCD by using a lens as well as by using photo multiplier means.

Unfortunately, some amount of light is induced in the non-scintillating optical fibers when they are exposed to radiation. This is an undesired background signal that is added to the main signal coming from the scintillator. This fiber light is emitted by two independent mechanisms, Čerenkov and fluorescence, by exposing the fibers to various high-energy photon and electron beams. With photons and electrons, the radiation-induced light is caused primarily by Čerenkov. This is not the case when the fibers are exposed to proton radiation, where fluorescence is the main source for the fiber light signal. Therefore, a background subtraction is suggested with the use of parallel light guides, without a scintillator attached, to measure the fiber light signal. To avoid the background subtraction, the ratio of the fiber light background signal to the scintillator light signal has been found as a function of the scintillating volume to be below 1%. Thus, scintillators with high emission efficiency are desired for a dosimetry system. Due to these requirements and in accordance with the higher efficiency shown by inorganic scintillating material the use thereof is better suited for detectors.

A second undesired effect involved in the scintillation dosimetry is the well known ionization quenching, which shows up a decreasing scintillating efficiency with increasing ionization density. The loss of emission efficiency is pronounced in the Bragg peak region due to the increased stopping power of the protons compared to the one in the plateau and it depends on the type of scintillator used.

With respect to the medical application of proton radiation, such as radiation therapy to cure people from cancerous diseases, an effective radiation directed to the cancerous tumor has the highest priority in order to avoid any harm to the neighboring sane tissue. Therefore, high approaches are directed to the quality management of the proton radiation generator and to the beam design. Consequently, it is obvious that the aforementioned effects, like fiber light background signal and quenching, jeopardize the gain of reliable and exact quality planning in proton radiation therapy.

SUMMARY OF THE INVENTION

It is therefore the aim of the invention to provide both an inorganic scintillating material that does not or only in a negligible manner shows the afore-mentioned disturbing quenching characteristics with high emission efficiency in order to avoid fiber light background subtraction and to provide a sensor assembly allowing particle dosimetry, such as proton or heavy ion dosimetry, in an efficient and high quality range.

This aim will be achieved according to the invention with respect to the inorganic scintillating material by an inorganic scintillating mixture comprising at least a first and a second component each having a characteristic behavior in response to the irradiation with charged particles, such as protons and heavy ions, showing a typical Bragg peak with respect to a relative dose; said first component having a ionization quenching characteristic in the Bragg peak region and said second component showing an increased efficiency in the Bragg peak region in comparison to a reference curve for the relative dose. Preferably, an inorganic scintillating mixture may comprise $Gd_2O_2S$:Tb and (Zn,Cd)S:Ag. This mixture combines the characteristics of both components $Gd_2O_2S$:Tb and (Zn,Cd)S:Ag under the respective proton radiation. Thereby, the $Gd_2O_2S$:Tb shows in the range of the Bragg peak the expected quenching behavior that leads to an artificial decrease of the relative dose in the depth where the Bragg peak is located. Surprisingly, the (Zn,Cd)S:Ag showed an increased efficiency in the Bragg peak under proton exposure. By using a mixture comprising these components both the quenching effect of the phosphor $Gd_2O_2S$:Tb and the unexpected increased efficiency of the phosphor (Zn,Cd)S:Ag are balanced and, therefore, the scintillating mixture displays exactly the actual relative dose, especially in the depth of the tissue or a anthropomorphic medium where the so-called Bragg peak occurs.

Excellent results have been shown when the content of $Gd_2O_2S$:Tb is in the range of 60 to 90% wt and the content of (Zn,Cd)S:Ag is in the range of 10 to 40% wt. Spoken in more general terms the content of $Gd_2O_2S$:Tb shall exceed the content of (Zn,Cd)S:Ag significantly. With respect to a 138 MeV proton beam the scintillating mixture became very well suited at $Gd_2O_2S$:Tb in the range of 75 to 85% wt and (Zn,Cd)S:Ag in the range of 15 to 25% wt.

An alternative embodiment according to the invention provides an inorganic scintillating mixture comprising an optical cement, $Gd_2O_2S$:Tb and (Zn,Cd)S:Ag. The content of optical cement allows, during the term of preparation of a sensor head, both the exact dosing of the required amount of the mixture and an optimal coupling of the mixture to an optical fiber. Again, a preferred composition thereof comprises the optical cement in the range of 20 to 60% wt, the $Gd_2O_2S$:Tb in the range of 30 to 60% wt and the (Zn,Cd)S:Ag in the range of 05 to 30% wt. Further, with respect to the 138 MeV proton beam, a preferred composition comprises optical cement in the range of 35 to 45% wt, the $Gd_2O_2S$:Tb in the range of 43 to 53% wt and the (Zn,Cd)S:Ag in the range of 07 to 17% wt, preferably 40% wt optical cement, 48% wt $Gd_2O_2S$:Tb and 12% wt (Zn,Cd)S:Ag.

The optical cement may have a binder characteristic holding the $Gd_2O_2S$:Tb and the (Zn,Cd)S:Ag in a desired mechanical shape.

With respect to the sensor assembly, the afore-mentioned aims are achieved according to the invention by a sensor assembly for charged particle dosimetry, such as proton or heavy ion dosimetry, comprising: a three-dimensional array of sensor heads; each sensor head being located on one end of an optical fiber; the opposite end of the optical fiber being associated with an optical light readout assembly; each sensor head and at least partially its optical fiber are inserted into a respective cavity located in a holder member.

This sensor assembly allows one to dispose a plurality of sensor heads in a three-dimensional shape in order to define a sensor volume, in which for the dosimetry purpose only one sensor head is hit by the proton beam as seen in the direction of the proton beam. This measure enables the minimization of the dose disturbances and therefore determines the relative dose for each fractional volume of the sensor volume. The choice of the right density and the type of suited scintillator for the sensitive volume represents in general a compromise between what is requested to avoid the fiber light background subtraction, namely a strong signal, and what is requested to minimize the disturbances on the dose distribution, namely a relative stopping power close to one and a small scintillating volume. A phosphor concentration, such as a $Gd_2O_2S:Tb$ concentration of 60%, and a radiation sensitive volume of 0.005 $cm^3$ guarantees a sufficiently high signal intensity to avoid the background subtraction thanks to a measured ratio of the scintillator light signal to the fiber light signal of less than 1%. This also allows a small sensitive volume for a better resolution reducing the impact on the dose distribution due to a relative high stopping power. Deriving under these circumstances the exact knowledge of the spatial distribution of the therapeutic concentration of the proton radiation allows the design of the gantry and the beam properties, like angle of the beam, movement of the patient, in order to provide an ideal technique for the intensity modulated proton therapy. Therefore, the sensor assembly can be used in a water phantom that is comparably similar to human tissue with respect to proton absorption and has therefore an anthropomorphic character.

In order to support the assembling of the sensor assembly, it may be very helpful if the holder member is a substantially cylindrical shaped organic body; said cavity is oriented along its longitudinal axis and has a depth aligned with the desired sensor head's position in said three-dimensional array. For that reason, the cavity allows the properly positioning of the sensor head.

Consequently, a simple embodiment for the alignment of the holder members is possible when the holder members may be attached in a holder block generating a regular pattern of the sensor heads as seen in a direction parallel to the longitudinal axis of the holder members. For the uniform arrangement of the sensor heads, the regular pattern may be a hexagonal pattern for accommodating the sensor heads relative to its adjacent sensor heads in an equidistant manner.

In order to both support an efficient assembling process and to offer a simple access for replacement of a sensor head or its optical fiber in case of failure, the holder block may comprise a stopper member being disposed opposite to the holder block assuring that each tip of the holder member is oriented with a distinct distance from the holder block as seen along the longitudinal axis of the holder member. Due to these features, a single holder member can be inserted into the holder block that can be designed as a plate having a plurality of holes for inserting the holder members and can be removed individually as well.

The reliability and sensitivity of the sensor assembly is highly desired due to its use for the quality management in proton therapy which requires that the sensor heads are held exactly in their desired position and that the sensor volume is kept free from external light sources. To fulfill these requirements, the holder member may comprise an annular notch being associated with a sealing ring, i.e. a rubber o-ring, disposed in the holder block or in the notch of the holder member. While inserting the holder member into the holder block the holder member snaps into the desired position by the cooperation of the notch and the ring.

With respect to the above-mentioned advantageous scintillating mixture, the sensor head may have a cylindrical shape and preferably comprises a mixture containing optical cement, $Gd_2O_2S:Tb$ and $(Zn,Cd)S:Ag$ in a composition as defined above. Typically, the sensor head may have a diameter in the range of 1 to 5 mm and a height in the range of 1 to 5 mm so as to design a sensor head having comparably small volume but high scintillating efficiency.

For the sensitivity of the sensor assembly it is tremendously important that a cross-talk of light portions generated in one distinct sensor head into adjacent sensor lines is avoided. Therefore, the phantom may be black, or the holder member, i.e. manufactured from PE or other suitable polymer material, can be black.

The surface of the sensor head opposite the surface connected to the optical fiber may be layered with a reflexion film reflecting the light portions back into the distinct sensor head and into the corresponding optical fiber. This is done to increase the light correction as well as to have a similar individual gain for several sensor heads.

Another important demand with respect to the spatial orientation of the sensor heads is the requirement that a proton beam shall only hit one sensor head as seen in the direction of the beam-line. Therefore, the three-dimensional array may be disposed in a cuboid sensor volume in a manner that the sensor head positions define a plane substantially parallel to the (111)-plane in a crystal having a cubic pattern.

Additional features and embodiments of the present invention are apparent to a person skilled in the art. The following description will explain some of the preferred embodiments and will quote the following drawings that are used to illustrate the present invention. Therefore, a brief description of the drawing is given below.

BRIEF DESCRIPTION OF THE SEVERAL VIEWS OF THE DRAWING

FIG. 6 is a schematic view on a sensor assembly for use with proton dosimetry;

FIG. 7 is a systematic plot of the relative dose in the dependency of the penetration depth for a proton therapy optimized to obtain a homogeneous physical dose distribution; and FIG. 8 is another systematic plot of the relative dose in the dependency of the penetration depth for a proton therapy optimized to obtain a homogeneous biological equivalent dose distribution.

DETAILED DESCRIPTION OF THE INVENTION

Figure 1:
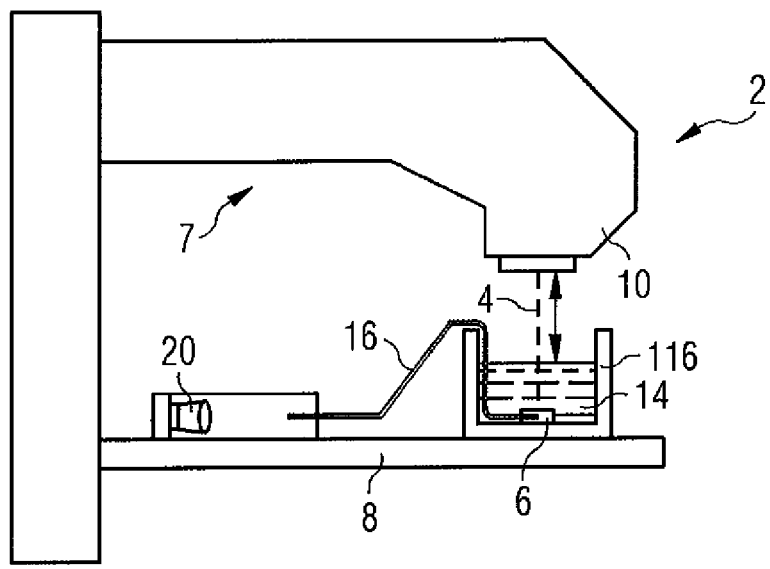
FIG. 1 is a schematic view of the experimental setup for proton dosimetry.

A spot-scanning technique, developed at the PSI in recent years, takes full advantage of the intrinsic potential of the proton depth dose distribution for medical applications for the treatment of deep seated tumors as this proton depth dose distribution can be applied by an experimental setup working as a proton irradiator 2 as shown in FIG. 1. The desired dose distribution is given by a three dimensional distribution of individual thin pencil beams 4 of protons applied to a target volume 6. The pencil beams 4 are so modulated to give a homogeneous radiation dose within the tumor. This is possible thanks to a unique proton gantry 7. The gantry 7 typically comprises a rotating beam delivery system 10 and a patient table 8. A so called sweeper magnet moves the beam 4 laterally parallel to itself in one direction. Then with the help of the range shifter, the energy of the beam 4 is modulated (scan in depth). The range shifter inserts polyethylene plates in the beam. The scan in the third direction, namely in the second lateral direction, is done by the shift of the patient table 8. The intensity of each spot is controlled by two independent monitors (ionization chambers) placed before the range shifter plates.

In this sense, it is mentioned that a four dimensional modulation of the beam 4 takes place—three dimensions for the position and one dimension for the time. This is an ideal technique for providing the intensity modulated proton therapy (IMPT). To ensure a safe patient treatment, sophisticated beam monitoring instruments and therapy plan verification tools are required. Steering files are the core for a completely computer controlled running therapy. They are responsible for the delivered dose by steering the position and the intensity of each individual proton pencil beam 4.

In order to achieve the perfect running therapy, the quality approach of the actually applied proton dose and its' distribution have to be known both highly reliably and exactly. Therefore, the applied proton dose is monitored by a testing arrangement using a sensor assembly as described in detail below.

Figure 2:
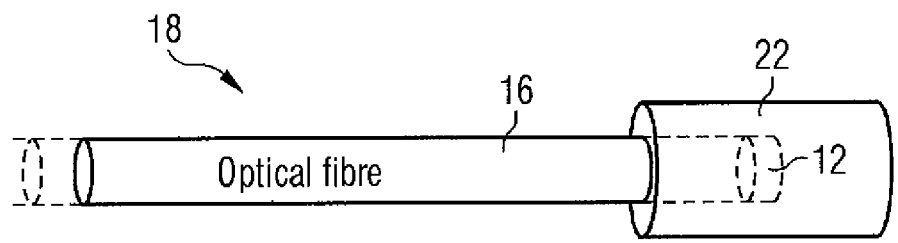
FIG. 2 is a schematic view of a sensor head to be used in an sensor assembly for proton dosimetry.

The measurements for determining the characteristics of the different intended scintillating powders are done with the scintillating detector's heads (one head 12 is shown in FIG. 2) placed directly in a water phantom 14 and kept at a fixed position. The depth dose curve is then obtained by stepwise changing the water level. The gantry 7 is at the 0 degree position (see FIG. 1). The water phantom 14 and the detector are placed on the patient table 8 of the gantry 7. Thus, the beam direction is orthogonal to the water surface.

Figure 5:
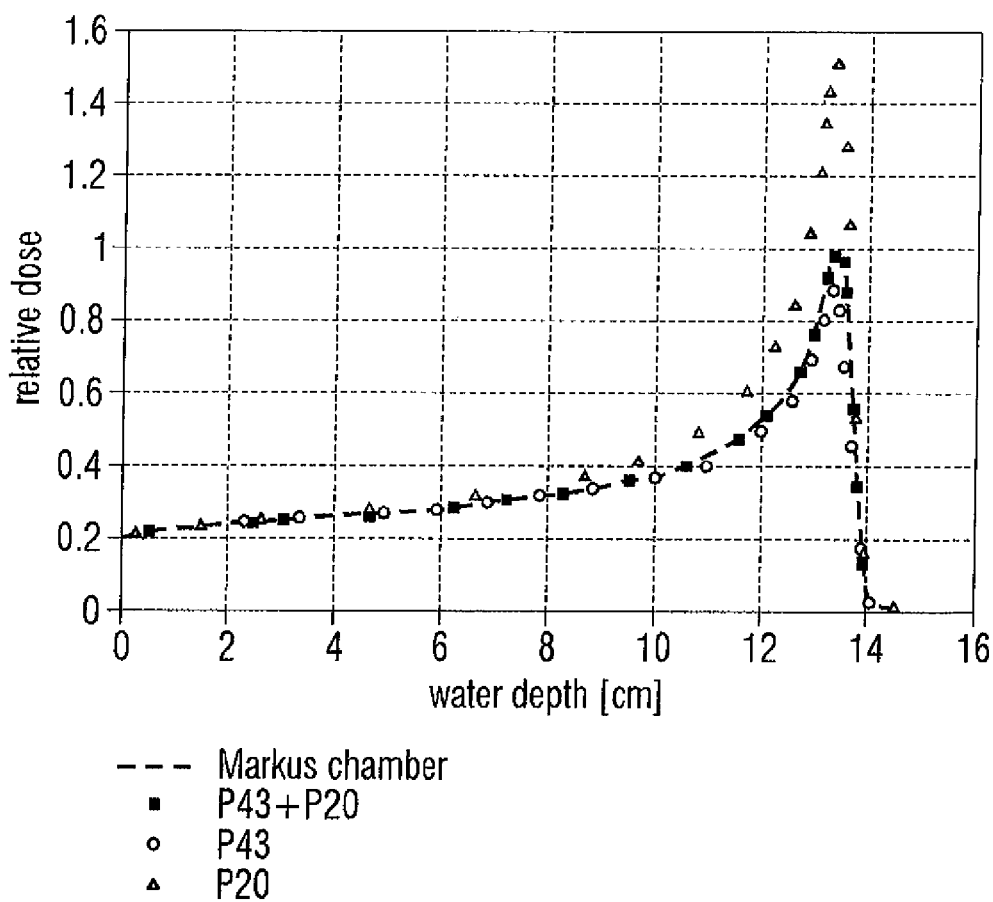
FIG. 5 is a depth dose curve measured with different compositions of the scintillating sensor head.

The water phantom 14 comprises an open Plexiglas™ box 116, which can be filled up with water thanks to a pump connected to a water tank. Little steps of about 1 mm water thickness and big steps of about 10-20 mm have been respectively chosen in the Bragg-peak region and in the plateau for the curves as shown in FIG. 5.

The used steering file delivers a surface dose for a 6×6 cm flat field. This means that for each spot of the field, the number of range-shifter plates inserted in the beam and the intensity were constant. The entrance energy of the protons was 138 MeV and the Bragg peak was located about 13.25 cm below the water surface.

The reference curve in water for the Bragg curve of 138 MeV proton beam has been measured with a Markus chamber. The used PTW Markus chamber is a small parallel-plate ionization chamber. It has a plate diameter of 6 mm and a plate distance of 2 mm. This gives a sensitive volume of 0.055 cm$^3$. The chamber is waterproof so that measurements have been performed directly in the water phantom 14 as shown in FIG. 5 with respect to the dashed curve for the Markus chamber.

The sensor head 12 produced for these experimental measurements uses a multiclad bicron fiber (BCF-98) as the optical fiber 16. This optical fiber 16 comprises a polystyrene-based core and two layers of cladding. The outermost layer has the lowest refractive index n thus permitting total internal reflection at the second boundary. The fiber's diameter is 2 mm and the numerical aperture is 0.74.

A fiber sensor 18 can be divided in two main components as follows: the sensor head 12 as the light production device and the optical fiber 16 as part of the light readout device. The light production device is the scintillating sensor head 12 of the fiber sensor 18, where the deposited proton energy is converted into light thanks to the presence of the phosphor powder. The light is then transferred to the light readout device by means of the optical fiber 16. The signal is then focused on a CCD (charge coupled device) 20 and analyzed via computer. FIGS. 1 and 2 schematically show these main components.

A Bicron BC-600 optical cement has been used to ensure an optimal coupling between the phosphor powder used in the sensor head 12 and the light guide of the optical fiber 16. BC-600 is a clear epoxy resin formulated specifically for making optical joints with plastic scintillators and acrylic light guide.

In one embodiment for the preparation of a millimeter big scintillating volume in the sensor head 12, first, a mixture of optical cement and phosphor powder in a certain concentration is carefully prepared. Then a small amount of the mixture (about 0.02 g) is dropped into a cylindrical Plexiglas™ holder member 22 and then coupled to the optical fiber 16. The holder member 22 is made of a 150 mm long cylindrical Plexiglas™ rod with a 15 mm cylindrical hole drilled in it in different depths for different fiber sensors 18 as described below the respect to FIGS. 4 and 6. It is mentioned that the material for the holder member 22 can be chosen in a broad versatility of materials, like PE, Polystyrole etc.

For each prepared scintillating head 12, a protocol is compiled describing the steps of the preparation and the quantities of cement and powder involved in order to know exactly the prepared concentration and the amount of powder coupled to the fiber. This method gives a high flexibility in the preparation of the scintillating heads with different powder concentrations and different mixture thicknesses Δx on the top of the fiber in order to compare their response when they are exposed to ionizing radiation. According to the present invention, two different phosphor powders were mixed together to obtain a new powder composition that satisfies specific requirements as is described below.

The signal transferred by the optical fiber is focused on a CCD 20 by an optical lens in a lightproof black box. The lens is the Nikkor™ AF-S 17-35 mm f/2.8D IF-ED wide-angle zoom. In all the measurements the zoom was set to 17 mm focal length and maximal aperture, namely f/2.8. The system can focus on more than one fiber in order to study several detector heads at once. The Full-Frame CCD image Sensor used is a Kodak™ KAF-0401E (Apogee instruments). It is a high performance monochrome area CCD image sensor with 768×512 photoactive pixels (9 μm).

Table 1 shows the physical properties for scintillating heads manufactured from two different types of initial powders. This table gives an exemplarily plot of the scintillating heads 12 used to investigate their ionization density dependence. With respect to the known prior art, a first type of initial scintillating powder $Gd_2O_2S$:Tb (referred to as P43) has been used. The second type of sensor heads comprises the inventive mixture of both (Zn,Cd)S:Ag (referred to as P20) and P43 in different compositions.

In the first column of Table 1, C is the concentration of phosphor powder in the optical cement. Thus $C=m_p/(m_p+m_c)$, where $m_p$ and $m_c$ are respectively the powder mass and the optical cement mass in the mixture. Hence $m_p=m_{43}+m_{20}$, where $m_{43}$ and $m_{20}$ are respectively the mass of $Gd_2O_2S$:Tb (P43) and the mass of (Zn,Cd)S:Ag (P20). In the table $M_{43}$ and $M_{20}$ are respectively the masses of the two powders relative to the total powder mass in the mixture, thus $M_{43}=m_{43}/m_p$ and $M_{20}=m_{20}/m_p$. Examples for a pure P43 mixture are given, as well as for the inventive P43+P20 mixture in a given ratio. The powder concentration C and the phosphor ratio $M_{20}/M_{43}$ are input to calculate, respectively, the effective density $\rho_{\mathit{eff}}$ and the relative stopping power $\rho_s$ of the radiation sensitive volume. The densities of the optical cement, P43 and P20 are respectively 1.18, 7.3, 4.35. In the last column, Q is the quantity of powder in the sensitive volume of a thickness $\Delta x$ of 3 mm. The dimension of Q is mg/cm² and indicates the amount of powder on the top of optical fiber per unit surface.

TABLE 1

Physical properties of typically created scintillating heads

| C [%] | $M_{43}$ [%] | $M_{20}$ [%] | $M_{20}/M_{43}$ | $\rho_{\mathit{eff}}$ | $\rho_s$ (Janni) | $\Delta x$ [mm] | Q [mg/cm² J] |
|---|---|---|---|---|---|---|---|
| 06.7 | 100 | — | — | 1.25 | 1.25 | 3 | 25 |
| 22.8 | 100 | — | — | 1.46 | 1.36 | 3 | 100 |
| 57.8 | 100 | — | — | 2.30 | 1.80 | 3 | 400 |
| 22.9 | 80 | 20 | 0.25 | 1.45 | 1.35 | 3 | 100 |
| 22.9 | 86 | 14 | 0.16 | 1.46 | 1.36 | 3 | 100 |
| 22.9 | 90 | 10 | 0.11 | 1.46 | 1.36 | 3 | 100 |
| 58.7 | 80 | 20 | 0.25 | 2.27 | 1.79 | 3 | 400 |
| 58.4 | 86 | 14 | 0.16 | 2.28 | 1.79 | 3 | 400 |
| 58.3 | 90 | 10 | 0.11 | 2.29 | 1.79 | 3 | 400 |

As seen in FIG. 5, $Gd_2O_2S$:Tb (P43) and (Zn,Cd)S:Ag (P20) have opposite responses in the Bragg peak. The first P43 shows a significant decrease in the relative dose in the so-called Bragg Peak due to its squenching characteristics. The second P20 on the contrary, shows a tremendously unexpected increase in the relative dose in the Bragg peaks. Only the inventive mixture P43+P20 was prepared so that the loss of efficiency for $Gd_2O_2S$:Tb (P43) could be compensated by the presence of (Zn,Cd)S:Ag (P20). It is expected, that small amount of (Zn,Cd)S:Ag mixed with $Gd_2O_2S$:Tb will raise the peak-to-entrance ratio of $Gd_2O_2S$:Tb, in order to get a ratio closer to the one measured with ionization chambers as given by the dashed line in FIG. 5. By assuming that the system has a linear response and with the help of the data of the measurement shown in FIG. 5, it is possible to estimate the amount of (Zn,Cd)S:Ag, that should be added to achieve this goal. The results of the estimation in the experimental setup according to FIG. 1 is a phosphor mixture comprising 80% wt of $Gd_2O_2S$:Tb and 20% wt of (Zn,Cd)S:Ag.

Hence, such a mixture has been prepared and tested as shown in FIG. 5. The good match of the curves is an indication that the system is linear and that with this method it is possible to modulate the height of the Bragg peak so as to obtain the same peak-to-entrance ratio as with the ionization chambers used so far.

Figure 3:
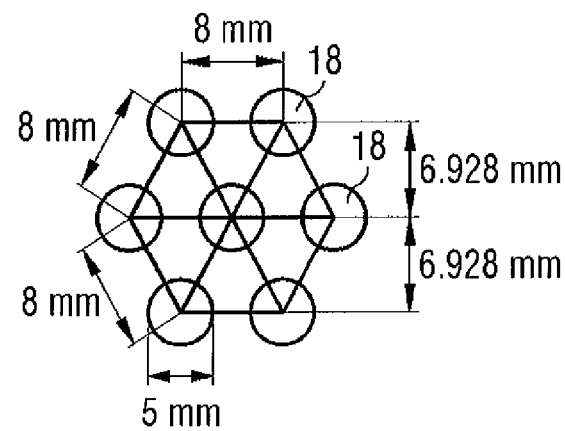
FIG. 3 is a schematic view on the geometrical disposition of the sensors in a sensor assembly for proton dosimetry.

FIG. 3 now depicts the disposition of the fiber sensors 18 when designing a three-dimensional array of sensor head positions. The fiber sensors 18 are disposed in a hexagonal lattice allowing one to dispose the fiber sensors 18 at an equal distance away from each of the directly adjacent fiber sensors 18. In this example, the center-to-center distance is 8 mm.

Figure 4:
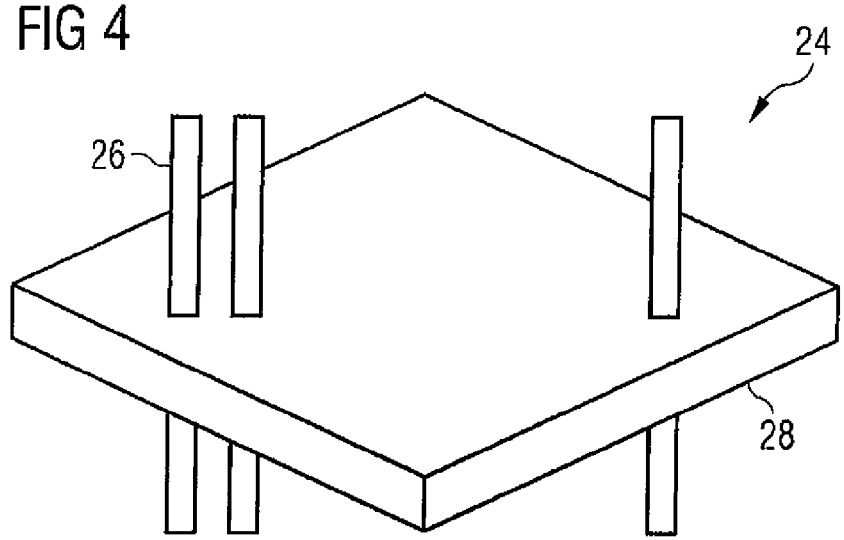
FIG. 4 is a view of a dummy glass tube arrangement in order to define a holder module for a sensor assembly for proton dosimetry.

FIG. 4 is view of a dummy holder block 24 showing a variety of dummy glass rods 26 kept in a holder plate 28. The dummy glass rods 26 represent the fiber sensors 18 (shown in FIG. 2) in an intermediate step of manufacturing the three-dimensional array of sensor heads 12 (shown in FIG. 1). At the tip of each dummy glass rod 26, a sensor head 12 will be located in the latter sensor assembly. From FIG. 4, it can be easily understood that the sensor heads 12 will be disposed in a plane similar to a 111-plane in a cuboid crystal structure. Therefore, an incident proton is absorbed only in one distinct sensor head 12 in order to generate a reliable signal for the absorbed dose in the volume of sensor head 12.

For manufacturing a sensor assembly, this dummy holder block can be casted with a tissue equivalent material, like rubber, such as caoutchouc, and the dummy glass rods 26 can be removed after the tissue equivalent material, in this example, rubber, is hardened. Subsequently, the fiber sensors 18 can be inserted instead of the dummy glass rods 26 until they reach their stop position in the rubber block. As a result, the sensor heads 12 are disposed in the same three dimensional appearance that was given by the former arrangement of the dummy glass rods 26.

Additionally, the arrangement according to FIG. 4 can also be used to manufacture a sensor assembly as will be described below with reference to FIG. 6. In this case, the holder plate 28 in FIG. 4 is equivalent to the holder plate 32a in FIG. 6. The sensor heads 12 for this embodiment, in the illustration of FIG. 4, represent an intermediate state of the manufacturing process disposed in the plane of the holder plate 28.

An alternate embodiment for designing a three-dimensional array of sensors heads 12 is given in FIG. 6 which, as an example shows a two-dimensional section of a three-dimensional sensor assembly 30. This sensor assembly 30 comprises a holder plate 32 having openings 34 in which the fiber sensors 18 are inserted until they reach their end position defined by a stop plate 36. The final end position is supported by a sealing ring 136 that is disposed in an annular notch 38 formed in the cylindrical Plexiglas™ holding member 22 and which snaps into a corresponding notch 40 in the holder plate 32. The holder plate 32 comprises, in this specific embodiment, two parts 32a, 32b that are attached to each other by detachable means, which are known to the person skilled in the art, such as screws etc., in order to improve the possibility of assembling the fiber sensors 18 and even disassembling those which failed in function.

In order to design the three dimensional shape of the array of sensor heads 12, in this embodiment the ingenious act is to provide cylindrical cavities 42 in the desired depth of the cylindrical Plexiglas™ member 22. In general, the fiber sensor 18 will be assembled prior to its insertion into the holder plate 32 as it is described with reference to FIG. 2. The cavities 42 might be generated by drilling or other suitable forming techniques as known to the person skilled in the art. By varying the depth of the cavities 42 and the respective disposal of the fiber sensor 18 in the lattice network, the desired three-dimensional structure is obtained. In an exemplary manner, the advantages of this three-dimensional structure is illustrated in FIG. 6 using four different portions 4a to 4d of the proton beam 4. The different portions 4a to 4c are absorbed in the respective sensors heads 12a to 12c. The light generated by the scintillating mixture P43/P20 that is comprised in the sensor head 12 is proportional to the respective dose in the respective sensor heads 12. The beam portion 4d is absorbed in a further sensor head that is located outside the section shown in FIG. 6. Anyway, due to the three-dimensional arrangement of the sensor heads 12, each beam section "sees", on its way towards the sensor volume that is defined by the three-dimensional array of the sensor heads 12, only one distinct sensor head 12, even in the case where the beam direction varies. In the shown embodiment, it is apparent that the situation does not change significantly when beam direction has a vector component perpendicular to the plane of the drawing. For instance, in case the three-dimensional array is designed according to the 111-plane in a cubic crystal lattice and comprises small discrete sensor heads, as shown in FIG. 2, the beam direction can be broadly varied. Only orienting the beam parallel to the 111-plane the arrangement of sensor heads 12 is no longer suitable. However, a very broad range of spatial beam orientations can be checked with this arrangement which has a vast impact on the improvement of quality securing procedures in proton therapy. It is also possible to change the 3d arrangement of the sensor for practical purposes into any desired shape.

In summarizing the aforementioned description, the new phosphor composition can be applied in the realization of a phantom (sensor volume) comprising a large quantity of small sensitive volumes (sensor heads 12), which can be irradiated from every arbitrary direction, so as to verify the dose distribution of IMPT plans. The sensitive volumes could have a cross section coupled to the optical fiber of 3.14 mm$^2$ and a thickness of 1.6 mm, which results in a small volume of 0.005 cm$^3$. As already mentioned, the relative stopping power of above suggested mixture P43/P20 is 1.8. This high value has to be kept in mind in the 3D-distribution of the sensitive volumes in the phantom in order to minimize disturbances on the dose distribution. The proposed arrangement avoids placing the sensitive volumes one after the other along the proton path, so that one volume sees the shadow of another one. The knowledge of the specific geometry and composition of the detector's head permits the realization of a virtual phantom for therapy plan calculation and Monte Carlo simulation, which could then take into account the presence of material with high stopping power so to verify the dose distribution calculated with such plans.

The phosphor $Gd_2O_2S$:Tb+(Zn,Cd)S:Ag could be used for the preparation of scintillating screens, as those applied in the diagnostic radiology. Dose measurements with the intensifier screens (Lanex screen) used at the PSI need a quenching correction, but this would not be the case for a screen with the right phosphor composition, as suggested above.

The measured peak-to-entrance ratio can be modulated by steering the ratio of the two powders P43 and P20 in the mixture. This could be exploited to make a detector that can simulate, to some extent, the biological response of irradiated tissues. The biological cellular damage is higher (higher RBE) for radiation with high LET. This is the case in the region of the Bragg peak where the discrepancy from the physical proton dose is larger.

The measured peak-to-entrance ratio can be modulated by steering the ratio of the two powders P43/P20 in the mixture. This could be exploited to make a detector that can simulate, to some extent, the biological response of irradiated tissues. The biological cellular damage is higher (higher Relative Biological Effectiveness RBE) for radiation with high LET. This is the case in the region of the Bragg peak where the discrepancy from the physical proton dose is larger. During therapy plan calculation, the dose distribution is optimized so to obtain a homogeneous physical dose within the target volume. Thus usually efforts are made to get a flat profile of the physical dose PD for a given beam direction within the target volume (see FIGS. 7 and 8, where SOBP represents the so-called spread out Bragg peak).

The clinical prescribed dose in the cobalt gray equivalent (CGE) is then obtained by multiplying the physical proton dose by constant RBE value of 1.1, which is the average RBE of protons used in clinical applications. But the biological response of the tissue, which can be described by introducing the concept of a "biological equivalent dose BED", is not completely flat as is the physical one, due to the fact that RBE changes with depth. This can be seen in FIG. 7, where the BED is scaled by the constant factor of 1.1 in case of proton irradiation. In the distal region of the SOBP, the dose is given primarily by protons with low energy (high LET), thus by the superposition of Bragg peaks, instead in the proximal region the dose is given primarily by the superposition of protons of the plateau. Therefore, an increasing biological equivalent dose with depth is expected while the physical dose is flat. The discrepancy between the physical and the biological equivalent dose is not significantly pronounced for protons, but it becomes relevant for heavy ion applications like the use of carbon ions in radiotherapy. In this case, an optimization of the biological equivalent dose BED instead of the physical dose PD is absolutely necessary and is always the case. The result of such an optimization for protons is plotted in FIG. 8. Now the profile of the biological equivalent dose BED is flat while the physical dose PD decreases with depth. As well for protons this would be the best optimization process. The development of models that describe the biological equivalent dose BED is a big challenge, which is based on in-depth biological examinations, like the interpretation of the damage of irradiated biological cells.

Due to the strong tissue and dose dependence of the biological response a unique model is not expected. What has to be pointed out is that, by steering the ratio of the two scintillating powders, it is possible to create dosimeters that simulate a given biological model in order to measure the biological equivalent dose BED, and others that at the same time can measure the physical dose PD, and to make a comparison between them. Thus, with these detectors, it is much easier to measure the biological equivalent dose BED because the use of "biological dosimeters", i.e. biological cells, is avoided.

The invention claimed is:

1. A sensor head including:
a proton beam detecting sensor head for measuring a penetration depth of a proton beam in tissue;
the sensor head including an inorganic scintillating mixture comprising at least a first and a second component each having a characteristic behavior in response to an irradiation with protons, showing a typical Bragg peak with respect to a relative depth dose; said first component having a quenching characteristic in a Bragg peak region and said second component showing an increased efficiency in the Bragg peak region, both being related to a reference curve for a relative dose.

2. The sensor head according to claim 1, comprising as the first component Gadolinium-Oxy-Sulfide $Gd_2O_2S$:Tb and as the second component Zinc-Cadmium-Sulfide (Zn,Cd)S:Ag.

3. The sensor head according to claim 2, wherein a content of $Gd_2O_2S$:Tb is in a range of 60 to 90% wt and a content of (Zn,Cd)S:Ag is in a range of 10 to 40% wt.

4. The sensor head according to claim 3, wherein the content of $Gd_2O_2S$:Tb is in the range of 75 to 85% wt and the content of (Zn,Cd)S:Ag is in the range of 15 to 25% wt.

5. A sensor head including:
a proton beam detecting sensor head for measuring a penetration depth of a proton beam in tissue;
the sensor head including an inorganic scintillating mixture comprising at least a first, and a second component;

the first and the second components having a characteristic behavior in response to an irradiation with protons showing a typical Bragg peak with respect to a relative depth dose;

the first component having a quenching characteristic in a Bragg peak region and the second component showing an increased efficiency in the Bragg peak region in comparison to a reference curve for a relative dose; and the first and the second components being held together.

6. The sensor head according to claim 5, comprising as the first component Gadolinium-Oxy-Sulfide ($Gd_2O_2S$:Tb), as the second component Zinc-Cadmium-Sulfide ($Zn,Cd)S$:Ag, and further comprising an optical cement having a binder characteristic holding the first and the second component in a desired mechanical shape.

7. The sensor head according to claim 6, wherein a content of the optical cement is in a range of 20 to 60% wt, a content of $Gd_2O_2S$:Tb is in a range of 30 to 60% wt and a content of $(Zn,Cd)S$:Ag is in a range of 05 to 30% wt.

8. The sensor head according to claim 7, wherein the content of the optical cement is in the range of 35 to 45% wt, the content of $Gd_2O_2S$:Tb is in the range of 43 to 53% wt and the content of $(Zn,Cd)S$:Ag is in the range of 07 to 17% wt.

9. The sensor head according to claim 7, wherein the content of the optical cement is about 40% wt, the content of $Gd_2O_2S$:Tb is about 48% wt and the content of $(Zn,Cd)S$:Ag is about 12% wt.

* * * * *